United States Patent [19]
Onoe et al.

[11] Patent Number: 5,261,808
[45] Date of Patent: Nov. 16, 1993

[54] SHAPING APPARATUS USING A LIQUID FORMING MEDIUM

[75] Inventors: Hideo Onoe, Aichi; Kimikazu Ikemoto, Toyota, both of Japan

[73] Assignee: Toyota Jidosha Kabushiki Kaisha, Toyota, Japan

[21] Appl. No.: 760,910

[22] Filed: Sep. 17, 1991

[30] Foreign Application Priority Data

Sep. 18, 1990 [JP] Japan .................. 2-246334

[51] Int. Cl.⁵ .................................. B29C 51/10
[52] U.S. Cl. .......................... 425/387.1; 425/394; 425/405.1
[58] Field of Search .......... 425/394, 397, 403, 405.1, 425/387.1

[56] References Cited

U.S. PATENT DOCUMENTS

| | | | |
|---|---|---|---|
| 2,516,373 | 7/1959 | Ehlert et al. | 425/394 |
| 3,007,206 | 11/1961 | Griswold | 425/387.1 |
| 3,439,078 | 4/1969 | Whiteford | 425/387.1 |
| 4,883,632 | 11/1989 | Goto et al. | 425/387.1 |

FOREIGN PATENT DOCUMENTS

| | | |
|---|---|---|
| 61-97322 | 6/1986 | Japan . |
| 62-25014 | 2/1987 | Japan . |
| 62-92020 | 6/1987 | Japan . |
| 63-154223 | 6/1988 | Japan . |
| 1-178324 | 7/1989 | Japan . |
| 1-186224 | 7/1989 | Japan . |
| 1-127614 | 8/1989 | Japan . |
| 1-127615 | 8/1989 | Japan . |
| 1-197017 | 8/1989 | Japan . |
| 1-135126 | 9/1989 | Japan . |

*Primary Examiner*—Tim Heitbrink
*Assistant Examiner*—Duane S. Smith
*Attorney, Agent, or Firm*—Finnegan, Henderson, Farabow, Garrett & Dunner

[57] ABSTRACT

A shaping apparatus utilizing liquid pressure includes a base constructed of a single member and including a lower die and a lower clamp which surrounds the lower die and is integral with the lower die, an upper clamp movable in a vertical direction above the lower clamp, and an upper die or punch movable in the vertical direction above the lower die. The upper die has a lower surface with a configuration to which a workpiece to be formed is pressformed. The lower surface of the upper die and the upper surface of the lower die define a cavity filled with liquid except for a small air pocket when the upper die is lowered. When the upper die is lowered, the upper die contacts and deforms the workpiece. At the same time, the liquid is contained under pressure in the cavity and presses the workpiece against the lower surface of the upper die so that the workpiece is formed precisely to the configuration of the lower surface of the upper die by the contained liquid.

10 Claims, 2 Drawing Sheets

SHAPING APPARATUS USING A LIQUID FORMING MEDIUM

BACKGROUND OF THE INVENTION

1. Field of the Invention

The present invention relates to a shaping apparatus of the type using a liquid forming medium. More particularly, it concerns shaping apparatus in which a workpiece to be formed is pressed by a solid upper die or punch on one side and is retained against the upper die by liquid contained on the other side of the workpiece.

2. Description of the Related Art

A shaping apparatus of the type using a liquid workpiece shaping medium is known and shown, for example, in Japanese Utility Model Publication SHO 61-97322. In FIG. 3 of the accompanying drawings, such a shaping apparatus includes a lower clamp 32 and an upper clamp 34 for clamping a workpiece W' therebetween, an upper die or punch 36 movable relative to the workpiece W' to deform the workpiece W' when lowered, and a pressure well 38 disposed below the lower clamp 32 as a separate component. The pressure well 38 defines a cavity 42 of large volume and in communication with a liquid flow passage 44 for respectively supplying and draining liquid F to and from the cavity 42. A well insert 40 may be inserted into the cavity 42 to reduce the inside diameter as well as the volume of the cavity 42.

In operation, the workpiece W' is peripherally clamped between the lower clamp 32 and the upper clamp 34. Then, the punch 36 is lowered to deform the workpiece W' against the liquid F' in the pressure well 38. The liquid constrains the workpiece W' against the punch 36 and acts to shape or conform the workpiece W' to the configuration of the lower surface of the punch 36.

However, there are the following problems in the conventional shaping apparatus of FIG. 3:

First, in the case where an upper surface 32a of the lower clamp 32 undulates in a peripheral direction between an elevated crest shown in cross section in FIG. 4 and a depressed valley shown in elevation on the center line of the lower clamp in FIG. 4, a liquid level cannot be set above a lowermost portion of the undulating upper surface 32a of the lower clamp 32. Air in a space V' below the elevated crest portions of the undulating surface 32a and the liquid surface results in air pocket while the workpiece W' is being press-formed. Though air in the air pocket is compressed and a volume of the air pocket is decreased during the work piece shaping operation, a relatively large volume of the air pocket still remains. The result is that a portion of the workpiece contacting the air pocket tends to acquire an undesirable fold deformation or wrinkle, and the visual quality of the workpiece is degraded.

Second, the liquid in the well 38 acts against the lower clamp 32 not only in a horizontal direction with a side pressure P1 but also in a vertical direction with a vertical pressure P2. Therefore, because the lower clamp 32 should be supported so as to be able to endure these pressure loads, the apparatus is large in size and of increased cost.

Third, since the volume of the cavity 42 in the pressure well 38 is large, for example, about 4,000 liters, it takes a relatively long period of time to supply and drain liquid to and from the cavity 42, and this makes it difficult to improve work efficiency.

Fourth, when the well insert 40 must be used for the purpose of decreasing the actual volume of the cavity, it has been found to be a difficult task both to put the well insert into the well and to remove the well insert from the well. Further, the well insert 40 requires an increase in the number of required parts and a resulting increase in cost.

SUMMARY OF THE INVENTION

An object of the invention is to provide a shaping apparatus of the type that utilizes contained liquid wherein the liquid containing cavity can be constructed to be much smaller than the cavity formed in the pressure well of the above-described conventional shaping apparatus so that the above-described problems are lessened or solved.

This and other objects are attained by a shaping apparatus in accordance with the present invention which comprises: a fixed base constructed of a single member and including a lower die and a lower clamp which surrounds the lower die and is integral with the lower die, the lower die having an upper surface, an upper clamp movable in a vertical direction above the lower clamp, the upper clamp and the lower clamp clamping a workpiece at the periphery thereof when the upper clamp is lowered, and an upper die movable in a vertical direction above the lower die independently of the upper clamp, the upper die having a lower surface with a configuration to which the workpiece is to be formed, the lower surface of the upper die, when lowered, and the upper surface of the lower die defining a cavity which is filled with liquid, the liquid contained in the cavity pressing the workpiece against the lower surface of the upper die when the upper die is lowered.

In the shaping apparatus in accordance with the present invention, since the cavity is defined between upper and lower dies, there is no requirement for a separate pressure well, which was provided below the lower clamp to enlarge the volume of a cavity formed in the well in the conventional shaping apparatus. As a result, the volume of the cavity formed between the lower die and the upper die is much smaller than that of the cavity formed between the pressure well and the upper die in the conventional shaping apparatus. Also, the invention reduces the volume of the air pocket in the liquid chamber and prevents the wrinkling of a workpiece during shaping. Further, since the lower clamp and the lower die are integral, no pressure load is generated to force the lower clamp upward, and the size of the lower clamp and supporting members can be kept small.

BRIEF DESCRIPTION OF THE DRAWINGS

The above and other objects, features, and advantages of the present invention will become more apparent and will be more readily appreciated from the following detailed description of the preferred embodiment of the invention taken in conjunction with the accompanying drawings, in which.

DETAILED DESCRIPTION OF THE PREFERRED EMBODIMENT

Figure 1:
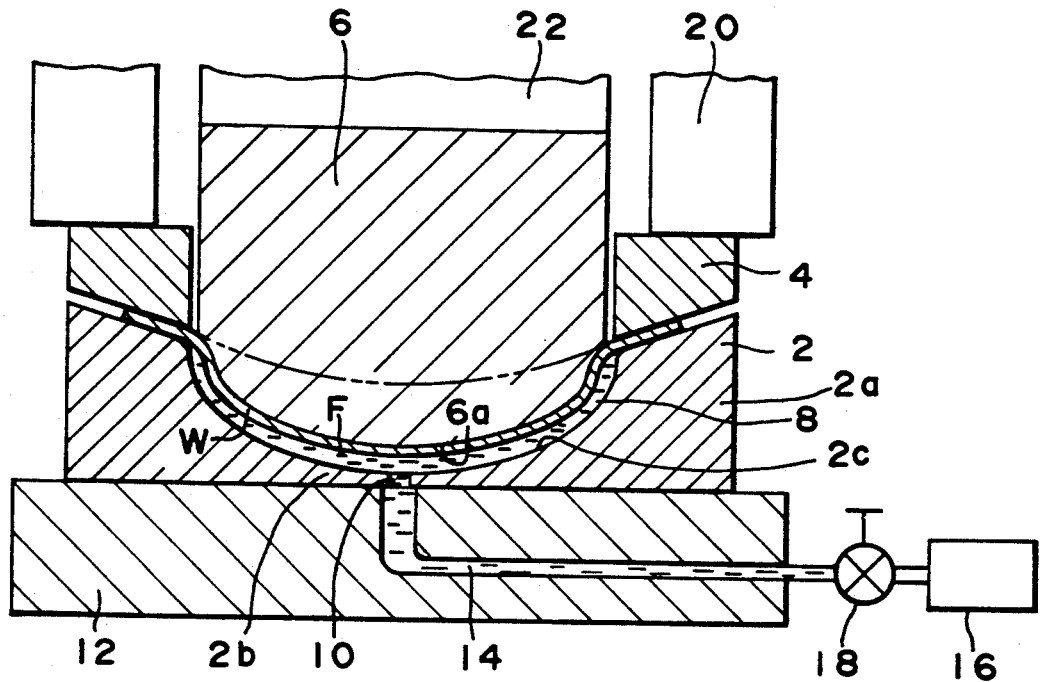
FIG. 1 is a cross-sectional view of an embodiment of a shaping apparatus constructed in accordance with the present invention.
Figure 2:
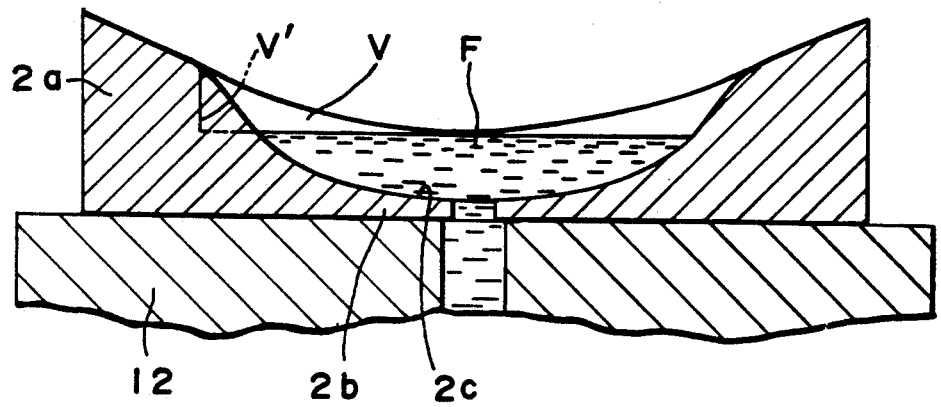
FIG. 2 is an enlarged partial cross-sectional view of a lower die, including the lower clamp, and bolster of the apparatus of FIG. 1.

As illustrated in FIGS. 1 and 2, the shaping apparatus in accordance with one embodiment of the present invention includes a monolithic fixed base 2 having a peripheral lower clamp portion 2a and a centrally disposed lower die portion 2b. An upper clamp 4, movable in a vertical direction, and an upper die or punch 6, movable in the vertical direction independently of the upper clamp 4, are also included. The shaping apparatus further includes a fixed bolster 12, an outer ram 20 driven in the vertical direction, and an inner ram 22 driven in the vertical direction independently of the outer ram 20. The base 2 is fixedly coupled to the bolster 12. The upper clamp 4 is preferably coupled to the outer ram 20, and the upper die 6 is preferably coupled to the inner ram 22. The base 2, the upper clamp 4, and the upper die 6 are replaceable and may be changed to accommodate to a change in the size or shape of a workpiece W to be press-formed. The bolster 12, the outer ram 20, and the inner ram 22 are generally not intended to be replaceable in a given apparatus.

In the illustrated embodiment, the fixed base 2 is a monolithic plate-like member having a substantially concave upper surface 2c. The lower die 2b is formed as the central portion of the fixed base 2, and the lower clamp 2a is formed as the peripheral portion of the fixed base 2. The lower clamp 2a and the lower die 2b are thus integral with each other and the lower clamp 2a essentially surrounds the lower die 2b. The lower clamp 2a has an upper surface which is preferably radially inclined downwardly and inwardly. The lower die 2b has an upper surface 2c which defines a cavity 8 for cooperation with a lower surface of the upper die 6 when the upper die 6 is lowered.

The upper clamp 4 is disposed above the lower clamp 2 so as to be movable relative to the lower clamp 2. The upper clamp 4 and the lower clamp 2 clamp the workpiece W to be formed at the peripheral portion of the workpiece W when the upper clamp 4 is lowered and is brought into contact with the peripheral portion of the workpiece W and the upper clamp 4. Clamping the workpiece W between the lower clamp 2 and the upper clamp 4 prevents wrinkles from being formed in the peripheral portion of the workpiece W during the shaping operation. The upper clamp 4 is raised and lowered by driving the outer ram 20 upward and downward.

The upper die 6 is disposed above the lower die 2b. The upper die 6 is raised and lowered by driving the inner ram 22 upward and downward. The upper die 6 has a lower surface 6a having a configuration to which the workpiece W is to be formed. The lower surface 6a of the upper die 6 comprises, for example, a downwardly convex surface. The lower surface 6a of the upper die 6 and the upper surface 2c of the lower die 2b define the cavity 8 therebetween. The spacing between the surfaces 6a and 2c, when the upper die is in its lowermost position, than the height of the cavity formed in the pressure well in the conventional shaping apparatus. For example, the height of the cavity 8 or the spacing distance between the surface 6a of the upper die and the surface 2c of the lower die in accordance with the embodiment of the present invention may be kept to within 5-10 mm.

The cavity 8, except for the air pocket, is filled with liquid F. When the upper die 6 is lowered, the lower surface 6a of the upper die 6 begins to contact the workpiece W oriented in the position shown by a phantom line in FIG. 1 and then deforms the workpiece W to the configuration shown by a full line in FIG. 1. At the same time, the liquid F, under pressure in the cavity 8, retains the deformed workpiece W against the lower surface 6a of the upper die 6 so that the workpiece W is formed precisely to the desired configuration.

Since the upper surface 2c of the lower die 2b does not contact the workpiece W during pressing, the upper surface 2c of the lower die 2b does not need to be a machined surface and is the surface of a casting. The ability to cast the base 2 and eliminate machining reduces manufacturing cost of the base 2.

The lower clamp 2a may have a peripherally undulating upper surface in a direction extending around the lower die. Where the lower clamp 2a has such an undulating upper surface, liquid F can be supplied to the concave upper surface of the base 2 up to the level of the lowest elevation of the undulating upper surface of the lower clamp 2a as shown at the center line of the base 2 to the right side of FIG. 2. When the upper die 6 has not yet been lowered, the concave surface of the base 2 is upwardly open, thus limiting the level of liquid that can be introduced into the concave surface of the base 2. When the lower clamp 2a has such an undulating upper surface, the upper clamp 4 also has a matching undulating lower surface to mate with the upper surface of the lower clamp 2a. Further, when the upper surface of the lower clamp 2a is a radially inclined surface as shown, the lower surface of the upper clamp 4 is also radially inclined to complement the lower surface.

The lower die 2b has a port 10 for respectively supplying or draining liquid to and from the cavity 8. The port 10 is formed in the substantially central portion of the lower die 2b and penetrates downwardly into the lower die 2b. The port 10 is in fluid communication with a fluid passage 14 formed in the bolster 12 which, in turn, is connected to a liquid source 16 via a pipe. A valve 18 is provided on the pipe for controlling the supply of the liquid, which may be oil, for example, to and from the cavity 8.

Operation of the above-described shaping apparatus will now be explained.

Liquid F is supplied onto the lower die 2 through the port 10. In this instance, in the case where the lower clamp 2a has an undulating upper surface, the liquid will be supplied to the level of the lowest portion of the peripheral upper surface of the lower clamp 2a as shown in FIG. 2.

A workpiece W to be formed is set on the base 2. Then, the upper clamp 4 is lowered to clamp the workpiece W at the peripheral portion of the workpiece between the upper clamp 4 and the lower clamp 2. In this state, the workpiece W is oriented and held in the position shown by the phantom line in FIG. 1.

Figure 3:
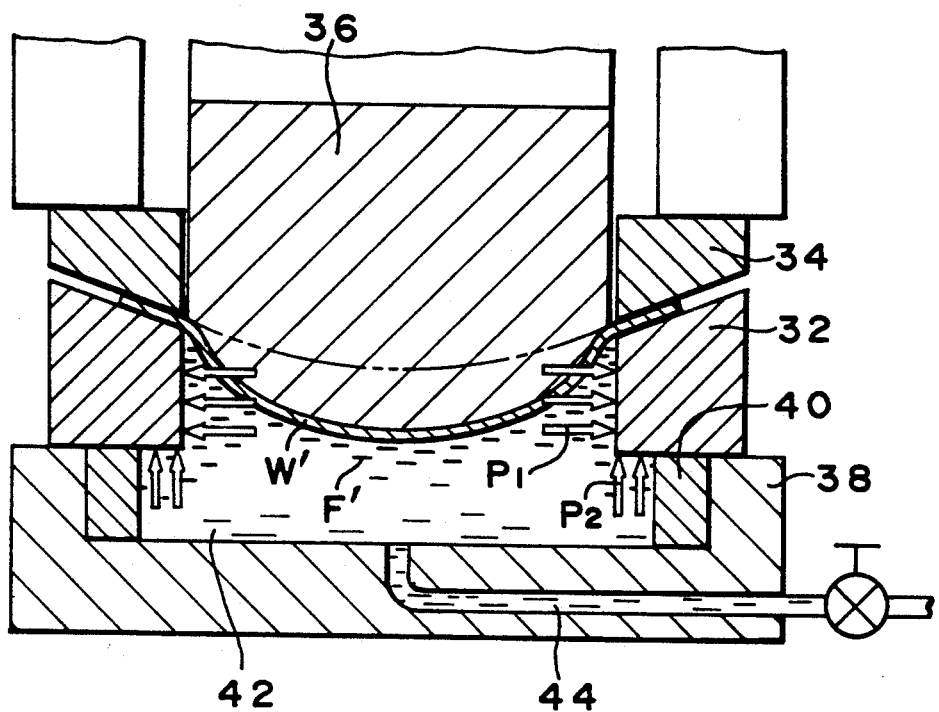
FIG. 3 is a cross-sectional view of a conventional shaping apparatus.
Figure 4:
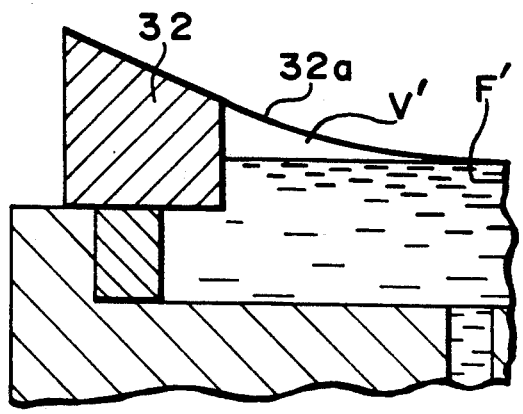
FIG. 4 is an enlarged partial cross-sectional view of a lower clamp, a pressure well, and a well insert of the apparatus of FIG. 3.

Then, the upper die 6 is lowered by driving the inner ram 22 downward to engage and deform the workpiece W. At this time, the cavity 8 is closed between the upper die 6 and the lower die 2b and the liquid F in the cavity 8 is subjected to a compressive load because the valve 18 is closed and the liquid cannot escape from the cavity 8 to the liquid source 16. The pressurized liquid forces the workpiece W against the lower surface 6a of the upper die 6. In this instance, because the lower die 2b is integral with the lower clamp 2a and is positioned not on a lower side but on an inner, lateral side of the lower clamp 2a, the lower die 2b can be designed so as to have the upper surface 2c positioned a small distance (5-10 mm) below the lower surface 6a of the upper die 6. As a result, the volume V of the cavity 8 is much smaller than the volume of the cavity formed in the pressure well of the conventional shaping apparatus. Due to this small volume of the cavity 8, the level of the liquid in the cavity 8 rises quickly when the upper die 36 is lowered, so that the workpiece W is forced uniformly into contact with the upper die surface 6a by the now contained liquid under compression, and is shaped with high dimensional accuracy. Further, because the cavity 8 is defined not by a vertically extending inner side surface of the lower clamp, as in the conventional apparatus of FIG. 3, but by a smoothly curved upper surface of the lower die 2b, any space remaining above the liquid surface and below the upper surface of the lower clamp 2a, which may result in an air pocket when the upper die 6 is lowered, is reduced from a volume V' in the case of a vertically extending side surface to a volume V in the case of the smoothly curved surface of the present invention. As a result, an air pocket, which might occur in the cavity 8 when the upper die 6 is lowered, is sufficiently smaller so that a wrinkle or other undesirable deformation is not developed in a portion of the workpiece contacting the air pocket.

In accordance with the present invention, the following advantages are obtained:

First, since the base 2 includes the lower die 2b, the volume of any air pocket which might occur in the cavity 8 during the shaping operation is much smaller than that of the conventional shaping apparatus, so that no undesirable deformation or wrinkle is formed in the portion of the workpiece W contacting the air pocket. This improves the quality of the workpiece appearance.

Second, since the base 2 is monolithic and therefore integrates the lower die 2b and the lower clamp 2a, a pressure well which was necessary in the conventional apparatus need not be provided in the shaping apparatus of the present invention. This reduces the volume of the cavity 8. As a result, the time needed for supplying and draining liquid to and from the cavity 8 is shortened, and it is not necessary to provide a well insert or the like in the cavity.

Third, since the lower clamp 2a and the lower die 2b are integral with each other, the lower clamp 2a does not receive an upwardly acting force from liquid contained in the cavity 8, and the lower clamp 2a and its supporting structure can be simplified and made compact.

Although only one embodiment of the invention has been described in detail above, it will be appreciated by those skilled in the art that various modifications and alterations can be made to the particular embodiment shown without materially departing from the novel teachings and advantages of the present invention. Accordingly, it is to be understood that all such modifications and alterations are included within the spirit and scope of the present invention as defined by the following claims.

We claim:

1. A shaping apparatus comprising:
   a monolithic fixed base including a portion defining a lower die and a portion defining a lower clamp surrounding the lower die, the lower die having an upper surface;
   an upper clamp movable in a vertical direction above the lower clamp, the upper clamp and the lower clamp cooperating to clamp a workpiece at a periphery thereof when the upper clamp is lowered; and
   an upper die moveable in a vertical direction above the lower die independently of the upper clamp, the upper die having a lower surface with a configuration to which the workpiece is to be formed, the upper surface of the lower die being of a configuration to be spaced uniformly by a small distance below the lower surface of the upper die and the workpiece when the upper die is lowered, the workpiece against the lower surface of the upper die, when lowered, and the upper surface of the lower die defining a cavity filled substantially with liquid and a pocket of air, a compressive force being generated in the cavity to retain the workpiece uniformly against the lower surface of the upper die when the upper die is lowered, said base having a port formed therein for supplying and draining liquid to and from the cavity.

2. A shaping apparatus according to claim 1, wherein the upper die is circumscribed by the lower clamp.

3. A shaping apparatus according to claim 1, wherein the upper surface of the lower die comprises a smoothly contoured curved surface surrounded by the lower clamp.

4. A shaping apparatus according to claim 1, wherein the small distance is 5-10 mm.

5. A shaping apparatus according to claim 1, wherein the upper surface of the lower die comprises a cast surface.

6. A shaping apparatus according to claim 1, wherein the lower clamp comprises a radially inclined surface and undulates in a peripheral direction.

7. A shaping apparatus according to claim 1, wherein the upper clamp comprises a radially inclined surface and undulates in a peripheral direction.

8. A shaping apparatus according to claim 1, wherein the upper die comprises a curved lower surface.

9. A shaping apparatus according to claim 1 and further comprising:
   a fixed bolster;
   an outer ram driven in the vertical direction; and
   an inner ram driven in the vertical direction independently of the outer ram;
   the base, the upper clamp, and the upper die being fixedly coupled to the bolster, the outer ram, and the inner ram, respectively.

10. A shaping apparatus according to claim 1 and further comprising a liquid source and a valve, the port formed in the lower die being connected to the liquid source via the valve.

* * * * *